(12) United States Patent
Kim et al.

(10) Patent No.: US 11,262,025 B2
(45) Date of Patent: Mar. 1, 2022

(54) HYDROGEN GAS STORAGE TANK

(71) Applicant: Robert Bosch GmbH, Stuttgart (DE)

(72) Inventors: Soo Kim, Cambridge, MA (US);
Jonathan Mailoa, Cambridge, MA (US); Anika Marusczyk, Stuttgart (DE); Matthias Kuntz, Stuttgart (DE); Friedrich Muehleder, Muehlacker (DE); Nathan Craig, Santa Clara, CA (US)

(73) Assignee: Robert Bosch GmbH, Stuttgart (DE)

( * ) Notice: Subject to any disclaimer, the term of this patent is extended or adjusted under 35 U.S.C. 154(b) by 16 days.

(21) Appl. No.: 16/675,610

(22) Filed: Nov. 6, 2019

(65) Prior Publication Data

US 2021/0131610 A1 May 6, 2021

(51) Int. Cl.
*F17C 1/10* (2006.01)

(52) U.S. Cl.
CPC ........ *F17C 1/10* (2013.01); *F17C 2201/0109* (2013.01); *F17C 2203/0607* (2013.01); *F17C 2203/0621* (2013.01); *F17C 2203/0643* (2013.01); *F17C 2209/232* (2013.01); *F17C 2221/012* (2013.01); *F17C 2270/0184* (2013.01)

(58) Field of Classification Search
CPC .. Y02E 60/32; F17C 11/005; F17C 2221/012; F17C 2203/0607; F17C 2203/0619
See application file for complete search history.

(56) References Cited

U.S. PATENT DOCUMENTS

| 3,912,458 | A | * | 10/1975 | Fukuma | F42B 3/04 |
| | | | | | 422/164 |
| 6,210,806 | B1 | | 4/2001 | Hidaka et al. | |
| 6,451,130 | B1 | | 9/2002 | Chung et al. | |
| 9,493,137 | B2 | * | 11/2016 | Andersson | B60R 21/268 |
| 2006/0076354 | A1 | * | 4/2006 | Lanzafame | H01M 8/04208 |
| | | | | | 220/560.04 |
| 2006/0266219 | A1 | * | 11/2006 | Ovshinsky | C22C 22/00 |
| | | | | | 96/108 |
| 2009/0199574 | A1 | * | 8/2009 | Hirose | F17C 11/005 |
| | | | | | 62/46.1 |
| 2010/0025411 | A1 | * | 2/2010 | Otsubo | F17C 1/14 |
| | | | | | 220/581 |

(Continued)

OTHER PUBLICATIONS

Ilevbare et al., "Oxygen Reduction Reaction Kinetics on Chromate Conversion Coated Al—Cu, Al—Cu—Mg, and Al—Cu—Mn—Fe Intermetallic Compounds," Journal of the Electrochemical Society, 148 (5) B196-B207 (2001). 13 pages.

(Continued)

*Primary Examiner* — Shawn M Braden
(74) *Attorney, Agent, or Firm* — Brooks Kushman P.C.

(57) ABSTRACT

A hydrogen gas storage tank includes a body including a steel bulk region and a passivating metal oxide layer adjacent to the steel bulk region, the oxide layer comprising a number of metal oxide molecules, all having a morphology, wherein at least about 51 wt. % of the number of metal oxide molecules are $Fe_2O_3$ molecules having morphologies of (012), (001), and/or (110) surface facets such that the oxide layer is configured to lower hydrogen adsorption into the steel bulk region by at least 25% compared to a steel bulk region free from the passivating metal oxide layer.

15 Claims, 3 Drawing Sheets

(56) References Cited

U.S. PATENT DOCUMENTS

| | | | | |
|---|---|---|---|---|
| 2010/0146992 A1* | 6/2010 | Miller | ............... | F17C 3/04 |
| | | | | 62/47.1 |
| 2011/0138748 A1* | 6/2011 | Olivier | ............ | C01B 3/0036 |
| | | | | 53/435 |
| 2011/0302933 A1* | 12/2011 | Immel | ............ | F17C 11/005 |
| | | | | 62/51.1 |
| 2013/0069630 A1* | 3/2013 | Manson | ............ | G01L 9/08 |
| | | | | 324/109 |
| 2015/0014186 A1* | 1/2015 | Wang | ............ | F17C 1/02 |
| | | | | 206/0.6 |
| 2015/0048605 A1* | 2/2015 | Andersson | ............ | B60R 21/268 |
| | | | | 280/741 |
| 2018/0291523 A1 | 10/2018 | Korinko et al. | | |
| 2019/0057781 A1* | 2/2019 | Wong | ............ | G21B 1/13 |
| 2020/0340625 A1* | 10/2020 | Wada | ............ | F17C 5/06 |
| 2021/0002747 A1* | 1/2021 | Kuntz | ............ | C22C 38/24 |

OTHER PUBLICATIONS

Begrambekov et al., "Hydrogen Transport Through Oxide Metal Surface Under Atom and Ion Irradiation," Journal of Physics, Conference Series 567 (2014) 012003. 6 pages.

\* cited by examiner

HYDROGEN GAS STORAGE TANK

TECHNICAL FIELD

The present disclosure relates to a stainless steel hydrogen gas ($H_2$) storage tank and a method of preparing a material for the storage tank.

BACKGROUND

Hydrogen gas is a viable contender for zero or relatively low emission fuel economy both in fuel cell vehicles (FCVs) and stationary applications. But storage of hydrogen gas remains a challenge from safety and materials science perspectives. While certain metals such as stainless steel seem like the ideal candidate, stainless steel is prone to hydrogen adsorption which may cause undesirable embrittlement. Thus, there has been a long-term need to improve steel for hydrogen gas pressurized storage tank applications to meet and/or exceed industry standards with respect to safety and durability.

SUMMARY

According to one embodiment, a hydrogen gas storage tank is disclosed. The tank may include a body including a steel bulk region and a passivating metal oxide layer adjacent to the steel bulk region, the oxide layer including a number of metal oxide molecules, all having a morphology, wherein at least about 51 wt. % of the number of metal oxide molecules are $Fe_2O_3$ molecules having morphologies of (012), (001), and/or (110) surface facets such that the oxide layer is configured to lower hydrogen adsorption into the steel bulk region by at least 25% compared to a steel bulk region free from the passivating metal oxide layer. The number of (012) surface facets in the $Fe_2O_3$ molecules may be greater than the number of (001) or (110) surface facets in the $Fe_2O_3$ molecules. The tank may be an on-board storage tank. The steel bulk region may include at least 10 to 20 wt. % Cr, based on the total weight of the steel bulk region. At least some of the (012), (001), and/or (110) surface facets may be Cr-doped. The number of metal oxide molecules may include a number of metal oxide molecules having morphology of Cr-doped $Fe_2O_3$ (001), (110), (100), (101), (012) and/or (104) surface facets. The number of metal oxide molecules may include a number of metal oxide molecules having morphology of $Fe_2O_3$ (024), (006), and/or (220) facets. The storage tank may further include a protective coating including MgO, $Al_2O_3$, $TiO_2$, $ZrO_2$, or combinations thereof and at least partially coating an exposed surface of the passivating metal oxide layer.

In an alternative embodiment, a hydrogen gas storage tank is disclosed. The tank may include a body including a steel bulk region and a passivating metal oxide layer adjacent to the steel bulk region. The metal passivating layer may include a number of metal oxide molecules, all having a morphology, wherein at least 51 wt. % of the number of metal oxides are $Fe_2O_3$ molecules having morphology of $Fe_2O_3$ (012), (001), and/or (110) surface facets such that the metal oxide layer has a layer morphology arranged to have more of a pseudo-cubic morphology and/or a hexagonal shape morphology than any other layer morphology. At least some of the (012), (001), and (110) surface facets may be Cr-doped. The steel may be carbon steel. The number of (012) surface facets in the $Fe_2O_3$ molecules may be greater than the number of (001) or (110) surface facets in the $Fe_2O_3$ molecules. The metal oxide layer may have a thickness of about 1 nm to 1 μm. The number of metal oxide molecules may include a number of metal oxide molecules having morphology of Cr-doped $Fe_2O_3$ (001), (110), (100), (101), (012) and/or (104) surface facets. The storage tank may further include a protective coating including MgO, $Al_2O_3$, $TiO_2$, $ZrO_2$, or combinations thereof and at least partially coating an exposed surface of the passivating metal oxide layer.

In a yet another embodiment, a method of preparing a steel substrate for a hydrogen gas storage tank body is disclosed. The method may include treating a surface portion of a steel substrate to reduce the substrate's dissociated hydrogen coverage by at least about 25% compared to an untreated steel substrate, by forming a passivating metal oxide layer including a number of oxide molecules, and having a morphology, where at least 51 wt. % of the number of metal oxide molecules are $Fe_2O_3$ molecules having morphology of $Fe_2O_3$ (012), (001), and/or (110) surface facets. The treating step may include electrochemically oxidizing the surface portion of the steel substrate. The treating step may include heat treating the steel substrate at about 180 to 700° C. in the presence of an oxidizing agent. The method may also include doping the passivating metal oxide layer with Cr. The treating step may be performed during shape forming of the steel substrate.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5%, or 10% of the value or relative characteristic.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. First definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Fuel cell vehicles (FCVs) have become increasingly popular and automakers are expanding their fuel cell vehicle fleets to serve the demand for relatively low or zero emission technologies. FCVs are a type of electric vehicles which use a fuel cell to generate electricity to power their motors, generally using oxygen from the air and compressed hydrogen. But FCVs face a number of challenges which present opportunities for improvement of the FCV technology.

Figure 1:
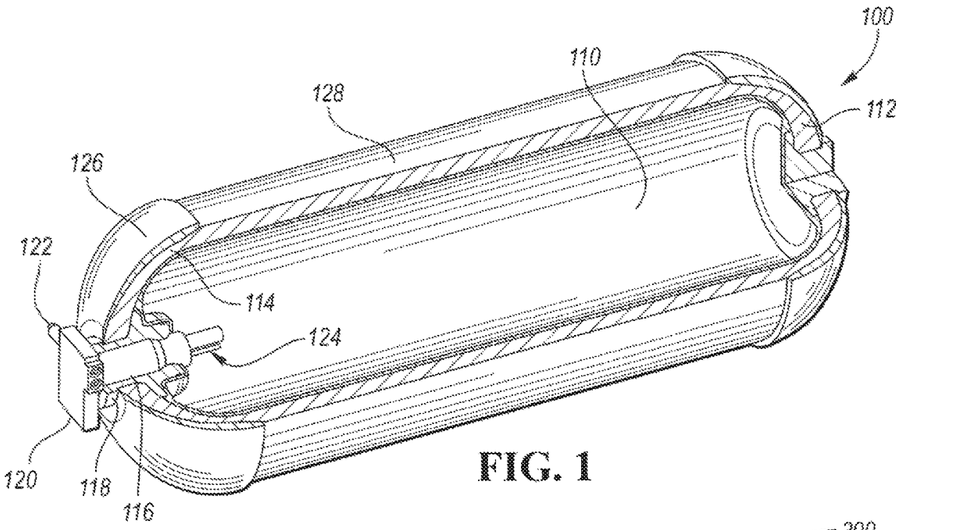
FIG. 1 depicts a schematic perspective view of a pressurized hydrogen gas storage tank according to one or more embodiments.

One of the challenges is providing a relatively low-cost on-board hydrogen gas storage that is safe, light-weight, and durable. Hydrogen gas may be stored in various materials or in a physical storage such as a hydrogen tank, canister, or a cartridge. A non-limiting example of a hydrogen gas storage tank is shown in FIG. 1. The $H_2$ storage tank 100 is typically a cylindrical hollow pressure vessel including an elongated body 110, a first and second end forming a dome 112, 114, and an opening 116 for uptake and/or release of the hydrogen gas. The opening 116 includes a boss 118, a manual or electrical valve or a regulator 120, a thermally activated pressure relief device 122, and one or more temperature sensors 124. The domes 112, 114 typically include a reinforced external protective layer serving as the dome protection 126, which is impact-resistant and capable of keeping $H_2$ under a standard pressure for the storage of gaseous hydrogen in a vehicle which is currently set at 70 MPa (700 bar).

The body 110 may include one or more layers 128 made from one or more materials. The materials should be light-weight and corrosion-, fatigue-, creep-, and/or relaxation-resistant. The one or more layers 128 typically include an aluminum-alloy layer lined internally with plastic lining and an external protective layer of carbon fiber-reinforced plastics with an additional shock-absorbing protective layer of fiber glass/aramid material on the outside. The industry has set a target of a 110 kg, 70 MPa cylinder with a gravimetric storage density of 6 mass % and a volumetric storage density of 30 kg·m$^{-3}$ for the on-board hydrogen gas storage tanks.

Hydrogen gas may also be stored in stationary high pressure gaseous hydrogen (HPGH2) storage vessels, mostly used to store $H_2$ in hydrogen refueling stations. Typically, a stationary HPGH2 includes seamless hydrogen storage vessel made from high strength steel and multifunctional layered stationary hydrogen vessel.

The material of choice has thus been a variety of aluminum or copper alloys, high strength or stainless steel, or carbon steel. A steel tank is considered to be one of the most economical, practical, and viable solutions for storing hydrogen gas; however, the adsorption of hydrogen atoms and/or molecules by the metal may lead to hydrogen metal embrittlement, causing ductility loss (reduction of elongation on fracture) even at stresses less than the tensile strength of the metal, possibly even at room temperature. Since safety is a very important criterion for designing a $H_2$ storage tank, reducing hydrogen adsorption, metal embrittlement, and/or ductility loss is beneficial. It would thus be desirable to identify and develop a stainless steel material highly suitable for hydrogen gas storage on-board and stationary applications which would mitigate or remove one or more of the drawbacks described above.

In one or more embodiments, a hydrogen storage tank is disclosed. The tank may have similar dimensions, configuration, parts, and shape as tank 100 depicted in FIG. 1. The tank may be any pressurized vessel or canister capable of safely holding hydrogen gas. The tank should have such dimensions and properties as to pass safety and other industry requirements for hydrogen gas storage tanks. The tank may be an on-board hydrogen gas storage tank or a stationary hydrogen gas storage tank. The tank may be cylindrical, polymorph, toroid, or have another suitable shape. The tank's capacity may vary from about 1 to a few thousand liters. The tank may be able to store different mass of hydrogen such as about 1-30, 2-20, or 3-10 kg, or any number in-between the mentioned range such as 1, 2, 3, 4, 5, 6, 7, 8, 9, 10 kg, or higher, at high pressure such as 200-1500, 300-1000, or 400-800 bar.

Figures 2A, 2B:
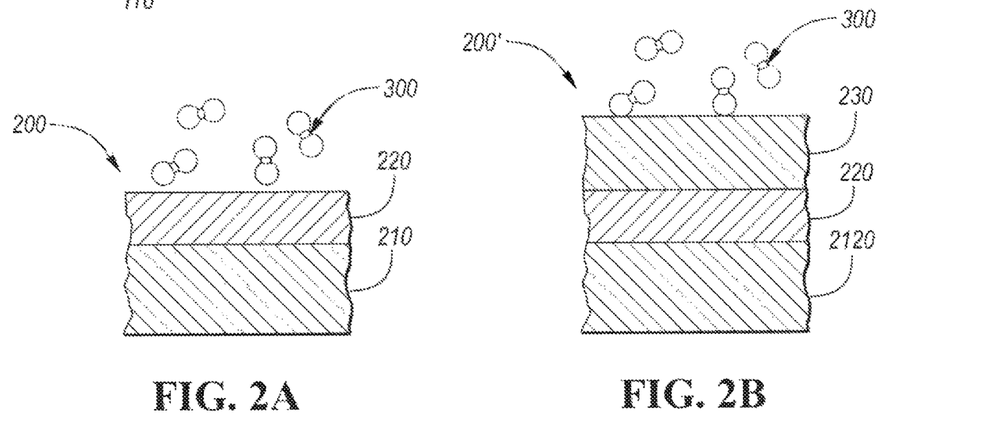
FIGS. 2A and 2B show schematic views of a steel bulk region of the hydrogen gas storage tank having a metal oxide layer and a protective layer, respectively.
Figure 3A:
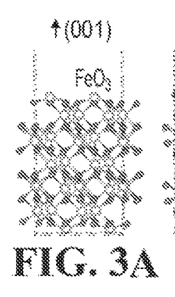
FIGS. 3A through 3F show slab models of six morphologically important surface facets of $Fe_2O_3$ on the steel surface.
Figure 3B:
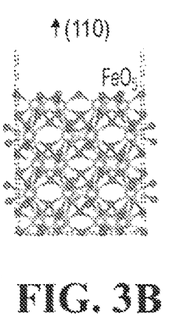
Figure 3C:
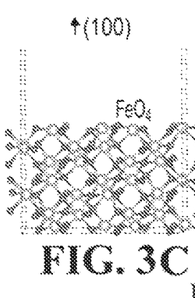
Figures 3D, 3E:
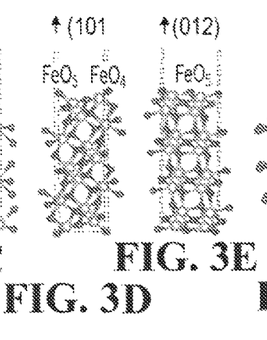
Figure 3F:
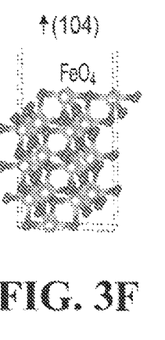

The tank's body 200, schematically depicted in FIGS. 2 and 3, may include steel. The steel may form bulk material region 210 of the tank. The steel 210 may be carbon steel or stainless steel. Stainless steel (SS) is the generic name for a number of different steel compositions. Stainless steel may contain at least about 10% of chromium (Cr) that can form a stable chrome-oxide surface layer that is known to prevent "staining" of the metal surface. SS304 and SS316 are examples of two stainless steel compositions. SS304 contains about 18% Cr and about 8% nickel (Ni), while SS316 contains about 16% Cr, about 10% Ni, and about 2% molybdenum (Mo). Depending on the application, the SS compositions may be varied to tailor mechanical stabilities, corrosion resistance, and/or magnetic properties.

Other elements in the stainless steel bulk region 210, besides Cr, Ni, and Mo, may include the following: carbon (~0.03%), manganese (1~2%), silicon (0.5 to 2%), nitrogen (0.01 to 0.1%), copper (0.5 to 2%), and cobalt (<0.5%), where the balance is iron (Fe). The steel may be Cr-rich steel including at least about 5 to 30, 10 to 25, or 15 to 20 wt. % Cr, based on the total weight of the steel. The steel may also or alternatively include about 1 to 20, 3 to 15, or 5 to 10 wt. % Ni, about 0.1 to 3 0.5 to 2.5, or 1 to 2 wt. % Mo, about 0.01 to 0.05, 0.02 to 0.04, or 0.03 wt. % C, about 0.1 to 3 0.5 to 2.5, or 1 to 2 wt. % Mn, about 0.1 to 3, 0.2 to 2.5, or 0.5 to 2 wt. % Si, about 0.001 to 0.5, 0.05 to 0.2, or 0.01 to 0.1 wt. % N, about 0.1 to 3, 0.2 to 2.5, or 0.5 to 2 wt. % Co, and/or about up to 0.5 wt. % Co, based on the total weight of the steel, where the balance is Fe.

When a steel surface contacts with water, air, and/or heat, metal oxide(s) may form at a surface region of the steel surface. The steel is thus naturally passivated by a variety of surface oxides, also known as rust, including $Fe_2O_3$ and other metal oxides such as NiO and $Cr_2O_3$, depending on the metal composition and manufacturing/metal treatment process. Even a thin, spontaneously-formed oxide film on the metal surface may significantly impact the metal's chemical and corrosion resistance.

It has now been surprisingly discovered that certain facets of the metal oxides may provide enhanced protection against corrosive species, depending on the composition, termination, and/or orientation of the surface facets, and that providing such facets on the steel surface provides enhanced protection against $H_2$ adsorption or $H_2$ diffusion into the steel surface and steel bulk and reduces or eliminates the undesirable steel embrittlement.

The metal oxide growth in a particular orientation is governed by the surface energy, where more energetically favorable facets tend to have a lower surface energy. However, a crystal can often change its form and preferred orientation in a highly-dynamic manner, which is directly impacted by the local surrounding or conditions such as various synthesis conditions leading to different chemical potentials, local passivation, choice of substrates, interfacial energy, molecule adsorption, the like, or a combination thereof. Therefore, it is possible to tune and favor the formation of certain surface facets, especially those with a very narrow range of surface energies because of their sensitivity to their local surroundings.

The tank may include one or more oxide layers 220 adjacent to the bulk steel material region 210 as is depicted in FIGS. 2A and 2B. The oxide layer(s) 220 may include one or more or a number of metal oxide molecules having such morphology that the metal oxide layer(s) 220 are configured to minimize and suppress hydrogen binding, adsorption, and/or dissociation reactions, slow down corrosion of the tank, or a combination thereof. The metal oxide layer(s) 220 may lower hydrogen adsorption into the steel bulk region by at least about 5-95, 15-85, or 25-75% compared to a steel bulk region free from the passivating metal oxide layer(s). The metal oxide layer(s) 220 may lower hydrogen adsorption into the steel bulk region by at least about 5, 10, 15, 20, 25, 30, 35, 40, 45, 50, 55, 60, 65, 70, 75, 80, 85, 90, 95, or more % compared to a steel bulk region free from or lacking the passivating metal oxide layer.

The oxide layer(s) 220 may include and/or be tailored to include one or more metal oxide molecules which are $Fe_2O_3$ molecules having the following morphologies in a relatively high amount: (012), (110), (001), and/or (104). A high amount may be about 20, 25, 30, 35, 40, 45, 50, 55, 60, 65, 70, 75, 80, 85, 90, 95, 99, or higher wt. % of one or more $Fe_2O_3$ (012), (110), (104), and (001) facets, based on the total weight or volume of the $Fe_2O_3$ molecule facets. A high amount may be about 20, 25, 30, 35, 40, 45, 50, 55, 60, 65, 70, 75, 80, 85, 90, 95, 99, or higher wt. % of one or more Cr-doped $Fe_2O_3$ surface facet in full or partial Cr substitution such as (012), (101), (100), (104), (001), and (110). The oxide layer(s) 220 may include predominantly at least one of the $Fe_2O_3$ surface facets (001), (110), (100), (101), (012), and (104). Predominantly means at least 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 48, 58, 6 87, 88, 89, 90, 91, 92, 93, 94, 95, 96, 97, 98, or 99 wt. %, based on the total weight or volume of the $Fe_2O_3$ molecule facets. At least one of the $Fe_2O_3$ molecule facets such as the (012) facet may be a dominant facet. The oxide layer(s) 220 may include more of the (012) facet than any other facet. The oxide layer(s) 220 may include about 10-90, 20-80, 30-70, 40-60, or 50 wt. % more of the (012) facet than at least one or than any other facet. The number of the (012) surface facets in the $Fe_2O_3$ molecules may be greater than the number of (001) or (110) surface facets in the $Fe_2O_3$ molecules. The number of metal oxide molecules may include a number of metal oxide molecules having morphology of $Fe_2O_3$ (024), (006), and/or (220) facets.

The metal oxide layer(s) 220 may thus have predominant morphology dictated by the type of $Fe_2O_3$ molecule facets they contain. For example, the metal oxide layer(s) may have a number of metal oxide molecules with predominantly pseudo-cubic morphology representing facets (012) and (110) or hexagonal shape morphology for dominating (001) facet. The metal oxides may be $Fe_2O_3$ molecules having morphology of $Fe_2O_3$ (012), (001), and/or (110) surface facets such that the metal oxide layer(s) 220 have a layer morphology arranged to have more of a pseudo-cubic morphology and/or a hexagonal shape morphology than any other layer morphology.

The metal oxide layer(s) 220 may range from a few nm to about 1 μm. The metal oxide layer(s) 220 may measure from about 0.1 nm to 10 μm, 0.5 nm to 5 μm, or 1 nm to 1 μm. The metal oxide layer(s) 220 may have uniform or non-uniform thickness. Alternatively, the metal oxide layer(s) may be about or at least about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 5.0 μm thick.

In addition to the oxide layer(s) 220, the tank may optionally include an additional coating or one or more protective layer(s) 230, as is depicted in FIG. 2B. The protective layer(s) 230 may range from a few nm to about 100 μm. The protective layer(s) 230 may include binary oxide coating materials including, but not limited to, MgO, $Al_2O_3$, $TiO_2$, and $ZrO_2$, or a combination thereof, where these oxides can be un-doped, and/or doped partially with nitrogen, carbon, or fluorine to further enhance the electronic conductivities. The protective layer(s) 230 may be ternary (or higher) chemical compounds, for example, $ABO_x$, where A and B can be Mg, Al, Ti, Zr, Zn, Sn, Cr, Mo, Si, Sc, Y, or a combination thereof. The protective layer(s) 230 may be doped either on the cation or anion site(s).

In one or more embodiments, a method of identifying hydrogen-adsorption blocking facets of one or more metal oxides configured to provide enhanced protection against $H_2$ adsorption to a steel surface is disclosed. The method may include a set of steps to examine the surface hydrogen reactions on metal oxide slab models. The method may include one or more of the following steps: (1) identifying the most common surfaces/facets/orientation of a metal oxide such as ferrous oxide that are observed in experiment and determine atomistic slab models of the surfaces or facets based on DFT, using the generalized gradient approximation (GGA) scheme within the Vienna ab-initio software (VASP) package; (2) evaluating $H_2$ adsorption energy (physisorption) on the surface oxygen atom in the individual facets of the metal oxide; (3) calculating $\frac{1}{2}H_2$ adsorption energy (chemisorption) on the surface oxygen atom in the individual facets of the metal oxide; (4) quantifying full dissociation energy of hydrogen atoms on the surface oxygen atom in the individual facets of the metal oxide; and (5) identifying one or more most resistant facets against physical/chemical adsorption of hydrogen.

The method may further include a set of steps to examine hydrogen moving towards the metal oxide bulk region, for example by placing a hydrogen atom at different adsorption sites.

The process described below applies to $Fe_2O_3$, but the process is also applicable to other metal oxides, which can be found or provided on a steel surface.

In step (1), using van der Walls (vdW)-inclusive DFT calculations, six morphologically-important surface facets of iron(III) oxide or ferric oxide ($Fe_2O_3$) were identified and studied: (001), (110), (100), (101), (012), and (104) faces. FIG. 3 show the different morphological surface systems or slab systems of ferrous oxide. As can be seen in FIG. 3, the bulk region of $Fe_2O_3$ is composed of $FeO_6$ octahedron, while the surface (exposed to vacuum) is under-coordinated (i.e., $FeO_{6-x}$, where $1 \leq x < 6$). For example, (110) and (012) surfaces are both terminated with $FeO_5$ polyhedrons. (101) has both $FeO_4$ and $FeO_5$ units on the surface, while both (100) and (104) have $FeO_4$ termination. Lastly, (001) is least coordinated, i.e., in $FeO_3$ termination. The large circles and small circles in FIGS. 3A-3F represent Fe and O atoms, respectively.

The atomistic slab models were based on DFT using the generalized gradient approximation (GGA) scheme within the Vienna ab-initio software (VASP) package.

Table 1 below summarizes the calculated DFT surface energies of various $Fe_2O_3$ surfaces shown in FIG. 3. The surface energy γ is an amount of energy required to cleave the bulk sample, creating two surfaces exposed to vacuum. Lower surface energy represents a more energetically favorable state (easier to grow for the lower energy surface).

The relative ratio between different DFT surface energies are similar, regardless of using different functionals such as GGA versus GGA+vdW. For example, in both cases, the (012) $Fe_2O_3$ is the most favorable surface and (100) and (104) are the least favorable surfaces. Table 1 further demonstrates that GGA+vdW will give more accurate binding energies for gaseous adsorbates (e.g., $H_2$ gas) compared to GGA scheme. Therefore, the GGA+vdW formalism was used for the DFT calculations.

DFT surface energy of $Fe_2O_3$ (γ) was calculated using the following equation (I):

$$\gamma = (E_{0,slab} - n \cdot E_{0,bulk})/(2A), \quad (I)$$

where $E_{0,slab}$ is the total internal DFT energy of the specific $Fe_2O_3$ slab shown in FIG. 3, $E_{0,bulk}$ is the internal DFT energy of the bulk $Fe_2O_3$ per formula unit, n is the number of formula units in the slab construction, and A is the surface area of a specific facet from the slab construction.

TABLE 1

| DFT surface energy of $Fe_2O_3$ (γ) for GGA and GGA + vdW systems | | | | | | |
|---|---|---|---|---|---|---|
| γ [J/m²] | (001) | (110) | (100) | (101) | (012) | (104) |
| GGA | 0.950 | 0.920 | 1.210 | 1.180 | 0.630 | 1.220 |
| GGA + vdW | 1.590 | 1.550 | 1.850 | 1.760 | 1.180 | 1.850 |

In step (2), $H_2$ adsorption energy (physical adsorption) on the surface oxygen atom in (001), (110), (101), (100), (012), and (104) $Fe_2O_3$ facets may be calculated using DFT-calculated $H_2$ binding energy ($\Delta E_{H2,ads}$) within GGA+vdW scheme with the following equation (II):

$$\Delta E_{H2,ads} = [E_{interface} - (E_{Fe2O3,surf} + 2\mu_{1/2H2})]/2, \quad (II)$$

where:

$E_{interface}$ and $E_{Fe2O3,surf}$ may be obtained from DFT calculations, and $\mu_{1/2H2}$ is the chemical potential of $0.5H_2$ gas ($\mu_{1/2H2}$=−3.381 eV/H).

A higher $\Delta E_{H2,ads}$ represents higher resistance against $H_2$ binding. The process is considered a "physical" adsorption or physisorption because $H_2$ gas and $Fe_2O_3$ does not form a chemical bond nor the electronic structure is perturbed upon adsorption. The fundamental interacting force of physisorption between $H_2$ gas and $Fe_2O_3$ surface is van der Waals (vdW) force.

Table 2 below shows the DFT-calculated physisorption energies for each $Fe_2O_3$ system depicted in FIGS. 3A-3F within the GGA+vdW formalism. (104) and (012) appear to be the most resistant facets against $H_2$ gas physisorption in comparison to (110), (100), (101), and (001) $Fe_2O_3$ surfaces. Additionally, the (012) $Fe_2O_3$ facet is easier to be accessed than (104) because the surface energy of (012) is much lower than (104) as can be seen in Table 1 above. In other words, while (104) shows the least $H_2$ gas binding tendency among the six $Fe_2O_3$ surface systems studied, it is unlikely to access (104) facet in $Fe_2O_3$. In contrast, (012) $Fe_2O_3$ facet, which has a lower surface energy than (104) may be easier to form in the $Fe_2O_3$ oxide film. Regarding the $Fe_2O_3$ oxide film, the (012) facet is a good candidate to increase steel resistance against $H_2$ physisorption process, compared to other $Fe_2O_3$ facets, which makes it more difficult for $H_2$ gas to penetrate through (012) $Fe_2O_3$ to reach the bulk steel region.

TABLE 2

| DFT-calculated physisorption energies for each $Fe_2O_3$ system | | | | | | |
|---|---|---|---|---|---|---|
| $\Delta E_{H2,ads}$ [eV/H] | (001) | (110) | (100) | (101) | (012) | (104) |
| | −0.620 | −0.356 | −0.459 | −0.613 | −0.103 | −0.031 |

In step (3), chemisorption of hydrogen on the individual surfaces was calculated. Unlike the physisorption process, a new chemical bond between the oxygen atom in $Fe_2O_3$ and the hydrogen atom was generated at the interface as is shown by the top-most arrow in FIG. 4. In other words, the hydrogen atom on the $Fe_2O_3$ surface was intact where $H_2$ gas was being dissociated on to the metal oxide surfaces.

GGA+vdW was used to calculate hydrogen chemisorption energy ($\Delta E_{H,ads}$) on the six $Fe_2O_3$ surfaces shown in FIGS. 3A-3F with the following equation (III):

$$\Delta E_{H,ads} = E_{interface} - (E_{Fe2O3,surf} + \mu_{1/2H2}), \quad (III)$$

where:

$E_{interface}$ and $E_{Fe2O3,surf.}$ may be obtained from DFT calculations, and $\mu_{1/2H2}$ is the chemical potential of $0.5H_2$ gas ($\mu_{1/2H2}$=−3.381 eV/H).

A higher $\Delta E_{H,ads}$ value represents higher resistance against hydrogen dissociation.

Table 3 confirms that (012) is a very protective, accessible $Fe_2O_3$ surface against hydrogen gas dissociation, compared to other $Fe_2O_3$ facets. For example, compared to (001) $Fe_2O_3$, (012) $Fe_2O_3$ is more protective against H dissociation by +0.6 eV/H. (104) and (101) facets are more protective against H dissociation than (110) and (001); however, because both (104) and (101) have high surface energies, they are less likely to be formed in $Fe_2O_3$ oxide film. Lastly, (110) and (001) have more negative values of $\Delta E_{H,ads}$, therefore, it is more beneficial to have less (110) and (001) $Fe_2O_3$ to avoid the hydrogen dissociation reactions.

TABLE 3

DFT-calculated chemisorption energies for each $Fe_2O_3$ system

| $\Delta E_{H,ads}$ [eV/H] | (001) | (110) | (100) | (101) | (012) | (104) |
|---|---|---|---|---|---|---|
| | −0.984 | −0.888 | −1.532 | −0.681 | −0.301 | −0.604 |

In step (4), the full dissociation energy of hydrogen atoms on the surface oxygen atom in (001), (110), (101), (100), (012), and (104) $Fe_2O_3$ facets was qualified. For the purposes of the assessment, all surface oxygen atoms near the vacuum were terminated with a hydrogen atom in the DFT slab models. The single hydrogen chemisorption results in Table 3 directly hinted at the hydrogen affinities at a very dilute limit of H concentrations, but the DFT-calculated results in Table 4 below represent the thermodynamic driving force of a complete, fully-covered, hydrogen dissociation reactions taking place on the $Fe_2O_3$ surface facets.

GGA+vdW calculated hydrogen dissociation energy ($\Delta E_{H,diss}$) on different $Fe_2O_3$ surfaces was calculated using the following equation (IV):

$$\Delta E_{H,diss.} = [E_{interface} - (E_{Fe2O3,surf.} + n\mu_{1/2H2})]/n, \quad (IV)$$

where:

n is number of hydrogen atoms terminating the $Fe_2O_3$ surface slab model.

A higher $\Delta E_{H,diss.}$ represents higher resistance against hydrogen dissociation reactions. As can be seen in Table 4, (012) is one of the most protective $Fe_2O_3$ surfaces against hydrogen dissociation reactions. (101), (104), and (100) have high surface energies which means that they are less likely to be accessible. The DFT calculations also indicate that while (001) is found to be very reactive at the dilute H coverage (Table 3), it has some resistance against the complete hydrogen dissociation reactions, compared to other $Fe_2O_3$ facets.

TABLE 4

DFT-calculated hydrogen dissociation energy ($\Delta E_{H,diss.}$) on different $Fe_2O_3$

| $\Delta E_{H,diss.}$ [eV/H] | (001) | (110) | (100) | (101) | (012) | (104) |
|---|---|---|---|---|---|---|
| | −0.230 | −0.418 | −0.515 | −0.042 | +0.135 | −0.418 |

Table 5 below summarizes the DFT calculation results on accessibility (GGA+vdW surface energy), $H_2$ adsorption ($\Delta E_{H2,ads.}$), single H dissociation ($\Delta E_{H,ads.}$), and complete dissociation ($\Delta E_{H,diss.}$). It is evident that (012) $Fe_2O_3$ facet is the most protective and desirable surface for preventing reactions with hydrogen. It is found that (110) is also more protective than the remaining facets. (001) $Fe_2O_3$, which is highly accessible in $Fe_2O_3$ system only provides some protection against hydrogen dissociation reaction, relative to other $Fe_2O_3$ surface facets. The other minor facets such as (101) and (104) have some protective characteristics, especially toward the dilute H coverage; however, the formation of (101), (100), and/or (104) is not necessary for increasing the protection against hydrogen.

TABLE 5

Summary of DFT-calculations for individual $Fe_2O_3$ facets

| Surface/facet | Accessibility | $\Delta E_{H2,ads.}$ [eV/H] | $\Delta E_{H,ads.}$ [eV/H] | $\Delta E_{H,diss.}$ [eV/H] |
|---|---|---|---|---|
| (012) | High (1.18 J/m²) | −0.103 | −0.301 | +0.135 |
| (110) | High (1.55 J/m²) | −0.356 | −0.888 | −0.042 |
| (001) | High (1.59 J/m²) | −0.620 | −0.984 | −0.230 |
| (101) | Low (1.76 J/m²) | −0.613 | −0.681 | −0.418 |
| (100) | Low (1.85 J/m²) | −0.459 | −1.532 | −0.418 |
| (104) | Low (1.85 J/m²) | −0.031 | −0.604 | −0.515 |

Figure 4A:
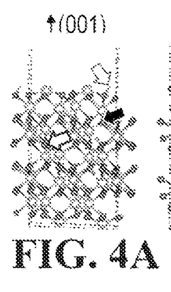
FIGS. 4A through 4F show a schematic model of single hydrogen diffusion on individual facets of $Fe_2O_3$ at the surface and bulk level.
Figure 4B:
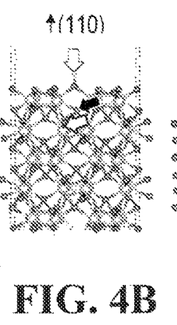
Figures 4C, 4D, 4E, 4F:
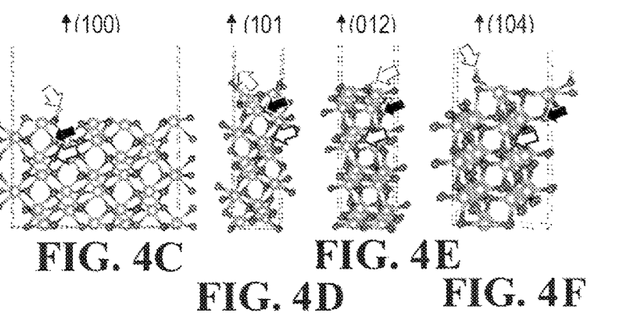

The method may further include a set or steps to examine hydrogen moving towards the metal oxide bulk region by placing a hydrogen atom at different adsorption sites within the metal oxide bulk region such as those depicted in FIG. 4. The slab models of different facets in FIG. 4 show the top-most arrow pointing at the placement of the hydrogen atom at the oxygen adsorption site. Subsequently, energy differences for placing hydrogen atom at the oxygen adsorption sites towards the metal oxide bulk region at the middle and bottom-most arrows, respectively, may be calculated using DFT. In FIG. 4, the largest circles represent Fe, the middle-size circles represent O, and the smallest circles represent H atoms.

Figure 5:
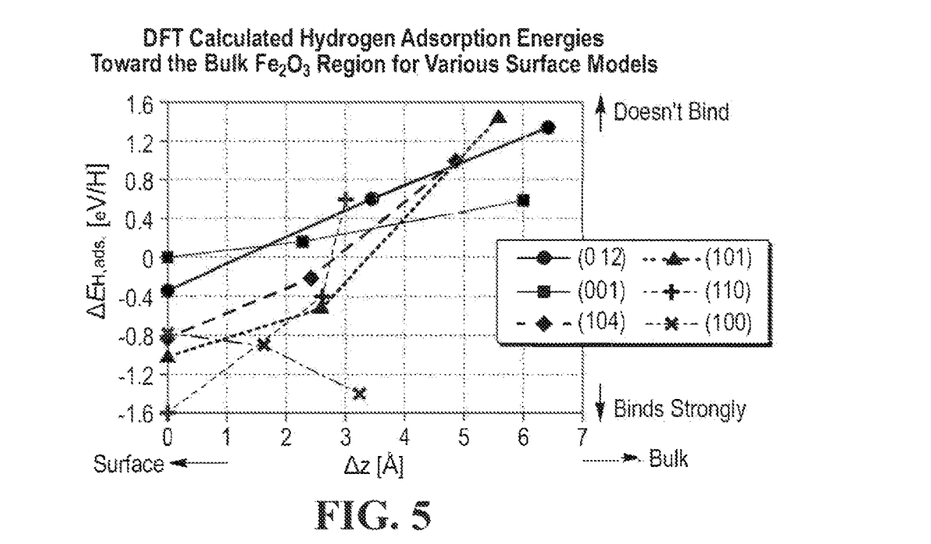
FIG. 5 shows density functional theory (DFT)-calculated hydrogen adsorption energies toward the bulk $Fe_2O_3$ region for various surface models shown in FIGS. 4A-4F.

DFT-calculated hydrogen adsorption energies toward the bulk $Fe_2O_3$ region for various surface models shown in FIG. 4 are depicted in FIG. 5. FIG. 5 shows the hydrogen adsorption energies (in eV/H) of different $Fe_2O_3$ surfaces as a function of distance (in Å), i.e., away from the outer-most surface layers. The x-axis ($\Delta z$) represents the distance away from the outer-most surface layer. For example, $\Delta z$=0 represents the hydrogen atom being placed at the $Fe_2O_3$ surface (near the vacuum). If $\Delta z$ increase, it represents the hydrogen atom placement is moving toward the bulk-region of $Fe_2O_3$ slab models.

The DFT-calculations and FIG. 5 indicate that it is most difficult for hydrogen to diffuse toward the bulk region in the (012) $Fe_2O_3$ orientation/surface/facet, as the DFT-calculated hydrogen adsorption energy is predicted to be >+1 eV/H. In addition, (101) and (104) show similar resistance against the hydrogen adsorption reaction toward the bulk, ~+1 eV. Furthermore, (001) and (110) show the adsorption energy of ~+0.5 eV (i.e., smaller, but some resistance). On the other hand, (100) $Fe_2O_3$ shows a negative adsorption energy regardless of the placement of hydrogen atom; therefore, it would be beneficial to minimize the (100) $Fe_2O_3$ facet.

Overall, the atomistic calculations and FIG. 5 confirm that having a passivating $Fe_2O_3$ metal oxide film on the $Fe_2O_3$ bulk region helps to suppress hydrogen diffusion toward the bulk region of $Fe_2O_3$, ultimately reducing the hydrogen embrittlement in bulk steel. Further, certain facets, especially the (012) as well as (101), (110), and (104) are the most useful facets in reducing hydrogen adsorption reaction in a pressurized hydrogen gas storage vessel having a steel bulk region.

Figure 6A:
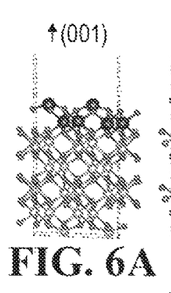
FIGS. 6A through 6F depict slab models for Cr-doped $Fe_2O_3$ surface facets.
Figure 6B:
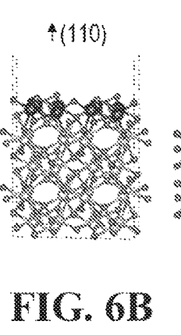
Figures 6C, 6D, 6E, 6F:
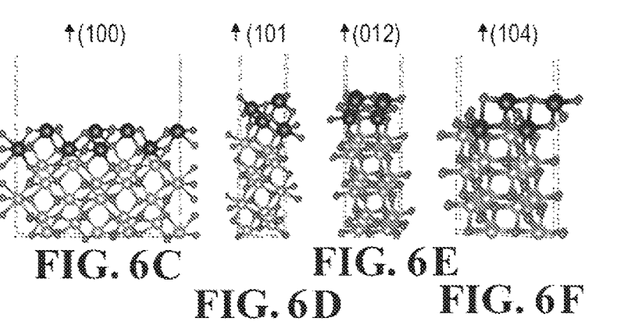

The method may be applicable to other metal oxides and doped surfaces. A non-limiting example may be Cr-doped $Fe_2O_3$ surfaces: (001), (110), (100), (101), (012), and (104) facets. Additional facets and/or lattice planes may be studied and identified as well such as (006), (013), (024), (202), (213), (220), etc. Atomistic slab models of the facets are depicted in FIG. 6, where the largest dark circles in the top-most two rows represent Cr atoms, the remaining large light circles represent Fe atoms, and the smallest circles represent O atoms. FIG. 6 depicts facets in which $Cr_2O_3$ fully passivated $Fe_2O_3$ surfaces. Alternatively, a $Cr_2O_3$ layer may form a thicker layer than the top-most two rows of $Fe_2O_3$ surface facets. As another alternative, $Cr_2O_3$ may cover the surface of $Fe_2O_3$ facets only partially, for example about 10-70, 20-60, or 30-50% of $Fe_2O_3$ surfaces may be covered by $Cr_2O_3$.

Cr doping energy on $Fe_2O_3$ surfaces may be DFT-calculated using the following equation (V):

$$\Delta E_{doping,Cr}=[E_{0,final}-n(\mu_{Cr}-\mu_{Fe})-E_{Fe2O3,surf.}]/n, \quad (V)$$

where:

$E_{0,final}$ is the total internal DFT energy of the Cr-doped $Fe_2O_3$ slab model shown in FIGS. 6A-6F, $E_{Fe2O3,surf.}$ is the internal DFT energy of the original (un-doped) $Fe_2O_3$ surface model, n is the number of Cr doping site, and $\mu_i$ is the chemical potential of element i (here, i=Cr or Fe).

The surface energy for Cr-doped $Fe_2O_3$ surfaces may be evaluated with the following equation (VI):

$$\gamma=E_{0,final}-\{xE_{Cr2O3,bulk}+(1-x)E_{Fe2O3,bulk}\}]/2A, \quad (VI)$$

where:

$E_{j,bulk}$ is the internal bulk DFT energy of species j (j=$Cr_2O_3$ or $Fe_2O_3$), x is number of formula unit for $Cr_2O_3$, and A is the surface area for each facet.

DFT calculations (i.e., $\Delta E_{doping,Cr}$=~−1 eV/site) show that the surface Cr doping in all $Fe_2O_3$ surface facets is thermodynamically favorable, as can be seen from Table 6 below. The energetics between different surfaces are mostly consistent for Cr-doped case except for the formation of (100) Cr-doped $Fe_2O_3$ surface, which is more preferred than (101) in Cr-doped $Fe_2O_3$, compared to the pure $Fe_2O_3$ facets. Such is the case also for the Cr doping energies and re-evaluated surface energies for 50% Cr-doped $Fe_2O_3$ surfaces. Doping energies are similar to 100% surface doped cases (~−1 eV), and the surface energetic preference is the same with 100% $Cr_2O_3$ surface covered $Fe_2O_3$ surfaces as with the 50% $Cr_2O_3$ surface covered $Fe_2O_3$ surfaces, as can be seen in Table 6. Here, surface doping represents the amount of $Fe_2O_3$ surface (e.g., top and some subsurface layers) being doped by $Cr_2O_3$.

The hydrogen dissociation calculation on Cr-doped $Fe_2O_3$ surfaces may be determined using DFT calculations for hydrogen dissociation energies ($\Delta E_{H,diss.,Cr}$) using the following equation (VII):

$$\Delta E_{H,diss.,Cr}=[E_{0,final}-(E_{Cr-doped\ Fe2O3,surf.}+n\mu_{1/2H2})]/n, \quad (VII)$$

where:

$E_{0,final}$ is the total internal DFT energy of hydrogen dissociated Cr-doped $Fe_2O_3$ surface model shown in FIGS. 6A-6F, $E_{Cr-doped\ Fe2O3,surf.}$ is the internal DFT energy of the Cr-doped $Fe_2O_3$ surface model, and n is the number of hydrogen adsorbate.

The results are shown in Table 7 below. As can be seen in Table 7, all of the calculated DFT dissociation energies are positive, indicating improved resistivity towards the surface hydrogen reactions or in other words, indicating that less hydrogen atoms bind onto the examined surfaces. Compared to the calculated dissociation tendencies for pure $Fe_2O_3$ facets shown in Table 4 above, $Cr_2O_3$ surface oxide film may reduce the hydrogen reactions for all $Fe_2O_3$ facet orientations.

TABLE 7

DFT-calculated hydrogen dissociation energy ($\Delta E_{H,diss.,Cr}$) on different $Fe_2O_3$ facets

| $\Delta E_{H,diss.,Cr}$ [eV/H] | (001) | (110) | (100) | (101) | (012) | (104) |
|---|---|---|---|---|---|---|
| | +0.727 | +0.229 | +0.387 | +0.633 | +0.137 | +0.647 |

The calculations have further revealed that the hydrogen coverage, defined as the number of hydrogen atoms per surface oxygen atoms, has decreased from 100% to 87.5% and 50% for (104) and (012) Cr-doped $Fe_2O_3$ surfaces, respectively, as observed in FIG. 6. The reduced H coverage simply indicates that less hydrogen atom will be adsorbed or dissociated on the Cr-doped $Fe_2O_3$ systems, compared to the pristine $Fe_2O_3$.

Figure 7:
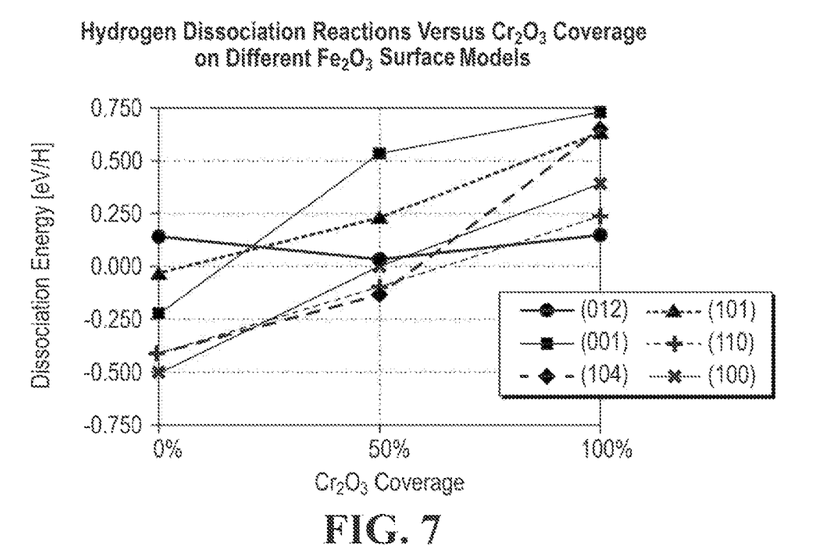
FIG. 7 shows a plot of hydrogen dissociation reactions versus $Cr_2O_3$ coverage on different $Fe_2O_3$ surface slabs.

Atomistic calculations of hydrogen dissociation reactions on 50% surface Cr-doped (001), (110), (100), (101), (012), and (104) $Fe_2O_3$ surfaces revealed that only 50% hydrogen atoms dissociated onto 50% surface Cr-doped (012) $Fe_2O_3$ surface model in comparison to 100% hydrogen coverage on pure $Fe_2O_3$ slab. The calculated hydrogen dissociation energy onto 50% surface Cr-doped $Fe_2O_3$ surfaces was typically between the pure $Fe_2O_3$ surface calculations and 100% surface Cr-doped $Fe_2O_3$ surfaces. (001), (101), and (012) surfaces with partial surface Cr-doping provided more resistance against reacting with hydrogen than the remaining facets. Either partial or full Cr doping/substitution on $Fe_2O_3$ facets increased the resistivity against reactions with hydrogen. Hydrogen dissociation reactions versus $Cr_2O_3$ coverage on different $Fe_2O_3$ surface slabs is shown in FIG. 7.

TABLE 6

DFT-calculated 100% and 50% Cr doping energy on $Fe_2O_3$ surfaces

| Cr-doped surface | % Cr-doped $Fe_2O_3$ surface | (001) | (110) | (100) | (101) | (012) | (104) |
|---|---|---|---|---|---|---|---|
| $\Delta E_{doping,Cr}$ [eV/site] | 100% | −1.097 | −1.099 | −1.179 | −1.081 | −1.014 | −0.944 |
| $\gamma$ [J/m$^2$] | | 1.860 | 1.750 | 1.990 | 2.100 | 1.570 | 2.210 |
| $\Delta E_{doping,Cr}$ [eV/site] | 50% | −1.202 | −1.148 | −1.438 | −1.088 | −1.038 | −0.937 |
| $\gamma$ [J/m$^2$] | | 1.660 | 1.630 | 1.790 | 1.930 | 1.360 | 2.030 |

H₂ gas physisorption onto selected 50% Cr-doped $Fe_2O_3$ surfaces: (001), (101), and (012) surfaces was also evaluated, indicating that the physisorption energies of $H_2$ molecules increased by +0.02 to +0.67 eV/H with partial Cr doping in these selected $Fe_2O_3$ surfaces, compared to pure $Fe_2O_3$ slab models.

Additionally, in one or more embodiments, a method for preparing a steel substrate for a hydrogen gas storage tank body. The method may include choosing a grade of stainless steel most suitable for the hydrogen tank bulk material according to the calculations provided above, for example Cr-rich steel. The method may utilize one or more steps of the method described above, identifying and testing suitable facets of metal oxides present on the steel surface. The method may include treating, controlling, adjusting, inducing formation, configuring, and/or maintaining certain chemistry of the metal oxides present on steel surface portion such that the metal oxides are grown and/or configured to have a high amount of beneficial facets, for example $Fe_2O_3$ (012) facet and other facets capable of reducing or eliminating hydrogen gas adsorption to the metal oxide surface, metal oxide bulk, and to the steel bulk region by a certain percentage disclosed above. The method may include treating a surface portion of a steel substrate.

The resulting system may have a reduced dissociated hydrogen coverage or hydrogen adsorption by about 1-75, 5-70, or 10-65% compared to the pristine system or a typical $H_2$ storage tank by forming a passivating metal oxide layer including a number of oxide molecules, and having a morphology, where a certain % of the number of metal oxide molecules are $Fe_2O_3$ molecules having morphology of $Fe_2O_3$ (012), (001), (110), (100), (101), and/or (104) surface facets. The hydrogen adsorption improvement % may be at about, at least about, or less than about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48 49, 50, 51, 52, 53, 54, 55, 56, 57, 58, 59, 60, 61, 62, 63, 64, 65, 66, 67, 68, 69, 70, 71, 72, 73, 74, or 75. The % of the number of metal oxide molecules which are $Fe_2O_3$ molecules having morphology of $Fe_2O_3$ (012), (001), (110), (100), (101), and/or (104) surface facets may be about or at least about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87 88, 89, 90, 91, 92, 93, 94, 95, 96, 97, 98, or 99.

The treating may be done by different manufacturing methods. A non-limiting example of a method may include solution-based processes. Hydrolysis on the steel surface may be conducted at about 80 to 100° C. in a water bath with various aging time of about 1, 2, 3, 4, 5, 10, 15, 20, 25, 30, 35, 40, 45, 50, 55, 60 minutes or longer. The reaction's time may also vary and be about 2, 3, 4, 8, 12, 16, 24, or 48 hours. The presence of Fe-containing precursor (e.g. $FeCl_3$) with acid (HCl, $HNO_3$, $H_2SO_4$) may be helpful to control the nucleation of different surface facet formations such as (012), (110), (001), (101), (100), and (104). Typically, if the preferred orientation involves (012) and (110) facets, $Fe_2O_3$ will have a pseudo-cubic morphology. If (001) is dominating, it is likely that $Fe_2O_3$ will have a hexagonal shape. The temperature, length of reaction, and precursors may be adjusted depending on the type of steel and its composition.

Alternatively, the treating step may include an electrochemical method to grow the desirable facets on the surface portion of the steel substrate. The steel bulk region or steel substrate may be polished and/or cleaned with an organic solvent such as ethanol, then electrochemically oxidized. The working electrode may be stainless steel and the counter reference electrodes may vary depending on the voltage windows. Pt foil and/or Ag/AgCl (with saturated KCl) may be used as the counter and reference electrodes. The immersed electrolytic solution may be an acid with varied concentration (e.g., 0.01 to 1 M sulfuric acid), where the exact pH may be adjusted or neutralized as needed.

The method may include doping metal oxides on the surface portion such as $Fe_2O_3$ with one or more additional elements such as Cr.

Additionally, the treating step may be performed by altering heat-treatment temperature, gas environment, etc. Different temperature may result in formation and/or different distribution of metal oxide facets. The steel may be heat-treated in a furnace such as a box furnace at a relatively low temperature of about 100-1000, 150-800, or 180-700° C. with the presence of mild oxidizing agent such as air, air/$O_2$, $N_2/O_2$, or the like. The steel may be annealed at relatively high temperatures of above about 600° C. prior to formation of the oxide surface. The annealing may be carried out under controlled atmosphere of reducing gases including CO and Hz; inert gases including $N_2$ and Ar; oxidizing gases including air and $O_2$; or, mixtures of the disclosed gases.

Additionally still, the treating may be done during shape forming by inducing the steel bulk region/steel substrate surface portion with additional elements.

Figure 8A:
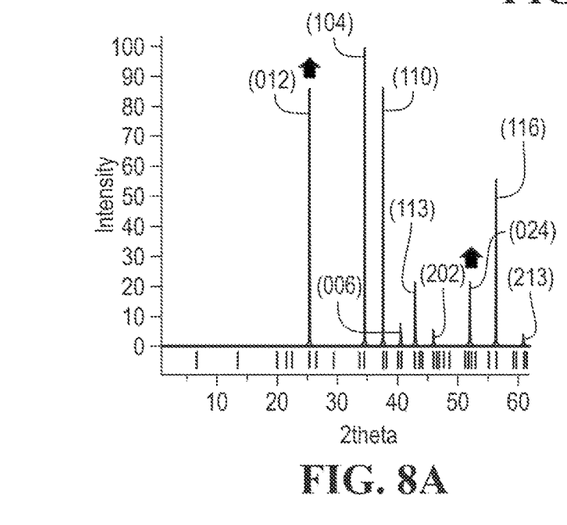
FIGS. 8A and 8B depict X-ray diffraction (XRD) peak intensities showing different distribution of surface facets on two non-limiting examples of $Fe_2O_3$ materials.
Figure 8B:
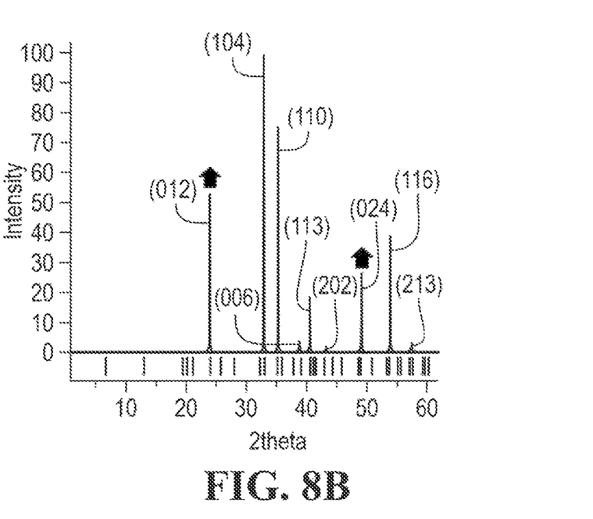

The presence of different metal oxide facets on the steel substrate surface portion such as $Fe_2O_3$ facets may be identified by observation of different morphologies and verified with X-ray diffraction (XRD) or high-resolution transmission electron microscope (HR-TEM). Two non-limiting examples of $Fe_2O_3$ having different distribution of various facets is shown in FIGS. 8A and 8B. The 2 theta values in the x-axis are given by using Cu as an X-ray source, specifically the Kα radiation of source of 1.54 Å. For example, (012) peak for $Fe_2O_3$ locates between 24 to 26° 2θ and (110) locates between 35 to 38° 2θ, when measured with XRD with Cu-Kα source (λ=1.54 Å), as shown in FIGS. 8A and 8B. The relative ratio of different planes may be further quantified using the relative XRD height and/or full-width at half maximum.

$Fe_2O_3$ with more (110) and (012) may be identified with HR-TEM with a d spacing of ~0.25 nm, where these types of particles or molecules may appear as having a cubic or pseudo-cubic shape. If (001) $Fe_2O_3$ face grows prevalent, $Fe_2O_3$ may appear as a hexagonal-shaped morphology. FIG. 8A shows an X-ray diffraction peak intensities for a more favorable application for hydrogen gas storage tank as the sample contains more (012) facets, which was determined the most optimal to prevent hydrogen adsorption to the steel bulk region.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A hydrogen gas storage tank comprising:
a body including a steel bulk region and a passivating metal oxide layer adjacent to the steel bulk region, the oxide layer comprising metal oxide molecules, wherein at least about 51 wt. % of the metal oxide molecules are $Fe_2O_3$ molecules having lattice planes of crystals in the (012), (001), and/or (110) lattice planes of unit cells of the lattice planes and each unit cell having an x-axis, y-axis, and a z-axis such that the oxide layer is configured to lower hydrogen adsorption into the steel bulk region by at least 25% compared to a steel bulk region free from the passivating metal oxide layer, the (012) lattice plane positioned parallel to the x-axis, at 1 of the y-axis, and at ½ of the z-axis, the (001) lattice plane positioned parallel to the x and y axes and at 1 of the z-axis, and the (110) lattice plane positioned at 1 of the x and y axes and parallel to the z-axis.

2. The storage tank of claim 1, wherein the number of (012) lattice planes in the $Fe_2O_3$ molecules is greater than the number of (001) or (110) lattice planes in the $Fe_2O_3$ molecules.

3. The storage tank of claim 1, wherein the tank is an on-board storage tank.

4. The storage tank of claim 1, wherein the steel bulk region includes at least 10 to 20 wt. % Cr, based on the total weight of the steel bulk region.

5. The storage tank of claim 1, wherein at least some of the (012), (001), and/or (110) lattice planes in the $Fe_2O_3$ molecules are Cr-doped.

6. The storage tank of claim 1, wherein the metal oxide molecules include Cr-doped $Fe_2O_3$ molecules.

7. The storage tank of claim 1, wherein the metal oxide molecules include $Fe_2O_3$ molecules having (024), (006), and/or (220) lattice planes, the (024) lattice plane positioned parallel to the x-axis, at ½ of the y-axis, and at ¼ of the z-axis, the (006) lattice plane positioned parallel to the x and y axes and at ⅙ of the z-axis, and the (220) lattice plane positioned at ½ of the x and y axes and parallel to the z-axis.

8. The storage tank of claim 1, further comprising a protective coating including MgO, $Al_2O_3$, $TiO_2$, $ZrO_2$, or a combination thereof and at least partially coating an exposed surface of the passivating metal oxide layer.

9. A hydrogen gas storage tank comprising:
a body including a steel bulk region; and
a passivating metal oxide layer adjacent to the steel bulk region comprising metal oxide molecules, wherein at least 51 wt. % of the metal oxides molecules are $Fe_2O_3$ molecules having lattice planes of crystals in the (012), (001), and/or (110) lattice planes of unit cells and each unit cell having an x-axis, y-axis, and a z-axis, wherein the number of (012) lattice planes in the $Fe_2O_3$ molecules is greater than the number of (001) or (110) lattice planes in the $Fe_2O_3$ molecules, the (012) lattice plane positioned parallel to the x-axis, at 1 of the y-axis, and at ½ of the z-axis, the (001) lattice plane positioned parallel to the x and y axes and at 1 of the z-axis, and the (110) lattice plane positioned at 1 of the x and y axes and parallel to the z-axis.

10. The storage tank of claim 9, wherein at least some of the (012), (001), and/or (110) lattice planes in the $Fe_2O_3$ molecules are Cr-doped.

11. The storage tank of claim 9, wherein the steel is carbon steel.

12. The storage tank of claim 9, wherein the metal oxide layer has a thickness of about 1 nm to 1 μm.

13. The storage tank of claim 9, wherein metal oxide molecules include Cr-doped $Fe_2O_3$ molecules.

14. The storage tank of claim 9, further comprising a protective coating including MgO, $Al_2O_3$, $TiO_2$, $ZrO_2$, or a combination thereof and at least partially coating an exposed surface of the passivating metal oxide layer.

15. The hydrogen gas storage tank of claim 1, wherein the lattice planes of the $Fe_2O_3$ molecules are at least 51 wt. % of the (012) lattice plane.

* * * * *

UNITED STATES PATENT AND TRADEMARK OFFICE
CERTIFICATE OF CORRECTION

| | |
|---|---|
| PATENT NO. | : 11,262,025 B2 |
| APPLICATION NO. | : 16/675610 |
| DATED | : March 1, 2022 |
| INVENTOR(S) | : Soo Kim et al. |

It is certified that error appears in the above-identified patent and that said Letters Patent is hereby corrected as shown below:

In the Claims

Column 15, Lines 36-37, Claim 1:
After "crystals in the (012), (001), an/or"
Delete "(110)"
Insert --(110)--.

Signed and Sealed this
Eleventh Day of April, 2023

Katherine Kelly Vidal
*Director of the United States Patent and Trademark Office*